United States Patent [19]
Dennis, Jr. et al.

[11] Patent Number: 4,584,583
[45] Date of Patent: Apr. 22, 1986

[54] LMS ADAPTIVE LOOP MODULE

[75] Inventors: Paul S. Dennis, Jr., Northport; Anthony M. Kowalski, Miller Place; Michael Weiner, Huntington Station, all of N.Y.

[73] Assignee: Hazeltine Corporation, Commack, N.Y.

[21] Appl. No.: 509,576

[22] Filed: Jun. 30, 1983

[51] Int. Cl.⁴ .......................... G01S 3/16; G01S 3/28
[52] U.S. Cl. .................................. 343/380; 343/378
[58] Field of Search ............... 343/380, 383, 378, 381, 343/379, 382, 384; 455/278

[56] References Cited
U.S. PATENT DOCUMENTS
4,280,128 7/1981 Masak .................................. 343/380

Primary Examiner—Theodore M. Blum
Assistant Examiner—Gregory C. Issing
Attorney, Agent, or Firm—E. A. Onders; F. R. Agovino

[57] ABSTRACT

An LMS adaptive control loop module for reducing the effects of received interference includes a single antenna coupled to a first hybrid for generating a reference channel and an auxiliary channel. The auxiliary channel provides I/Q signals from a second hybrid and I/Q drive signals from I/Q correlation multipliers which are used to weight the I/Q signals from said second hybrid. The weighted signals and the reference channel signals are combined and provide an output.

4 Claims, 3 Drawing Figures

LMS ADAPTIVE LOOP MODULE

The Government has rights in this invention pursuant to Contract F30602-80-C-0247 awarded by the Department of the Air Force.

BACKGROUND OF THE INVENTION

1. Field of the Invention

The invention relates generally to adaptive control loops for reducing the effects of received interference and, in particular, to a low cost LMS loop module.

2. Description of the Prior Art

Many current and planned communications, radar, avionics and microwave systems use LMS (least mean square) adaptive control loops to reduce the effects of received interference. Although most applications have addressed adaptive spacial processing, LMS techniques have been used in the time, frequency and polarization domains. Systems have been studied potentially requiring tens to hundreds of individual control loops. These systems range in operational radio frequency carrier frequencies from VLF to EHF. Channel bandwidths can vary from tens of hertz to hundreds of megahertz. Desired signal modulations cover virtually all known formats. As the potential for large scale production of many LMS-equipped systems increases, there is a need for a common low cost LMS loop module employing advanced single chip, signal processing devices such as Intel's 2920, NEC's uPD 7720, TI's TMS320 and the S2811 manufactured by American Micro Systems, Inc.

SUMMARY OF THE INVENTION

It is an object of this invention to provide a small, low cost adaptive control loop module using the LMS algorithm in order to make sophisticated ECCM processors economically feasible while maintaining high performance.

It is another object of this invention to provide a loop module which is compatable with many current and future communications systems by virtue of a design which can be implemented using advanced microcircuit technology.

The apparatus according to the invention is for cancelling undesired signals received with a desired signal. The apparatus has an output port and provides an output signal. First means provides the desired signal and any undesired signals received with the desired signal. A first hybrid has an input port coupled to the first means and has a reference output port and an auxiliary output port. The second hybrid has an input port coupled to the auxiliary output port and provides an in-phase output signal and a quadrature output signal. A first input port of an in-phase correlator multiplier is coupled to the auxiliary output port. The multiplier has a feedback input port coupled to the apparatus output port and provides an output signal. A first input port of a quadrature correlator multiplier is coupled to the auxiliary output port. The quadrature correlator multiplier has a feedback input port coupled to the apparatus output port and provides an output signal. The apparatus further includes means for providing in-phase drive signals and quadrature drive signals corresponding to the output signals of the in-phase and quadrature correlation multipliers, respectively. Means are provided for weighting the in-phase and quadrature output signals provided by the second circuit as it responds to the in-phase and quadrature drive signals. Means for summing the weighted in-phase and quadrature output signals and the signals provided by the referenced output ports is provided, said means for summing having the apparatus output port.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
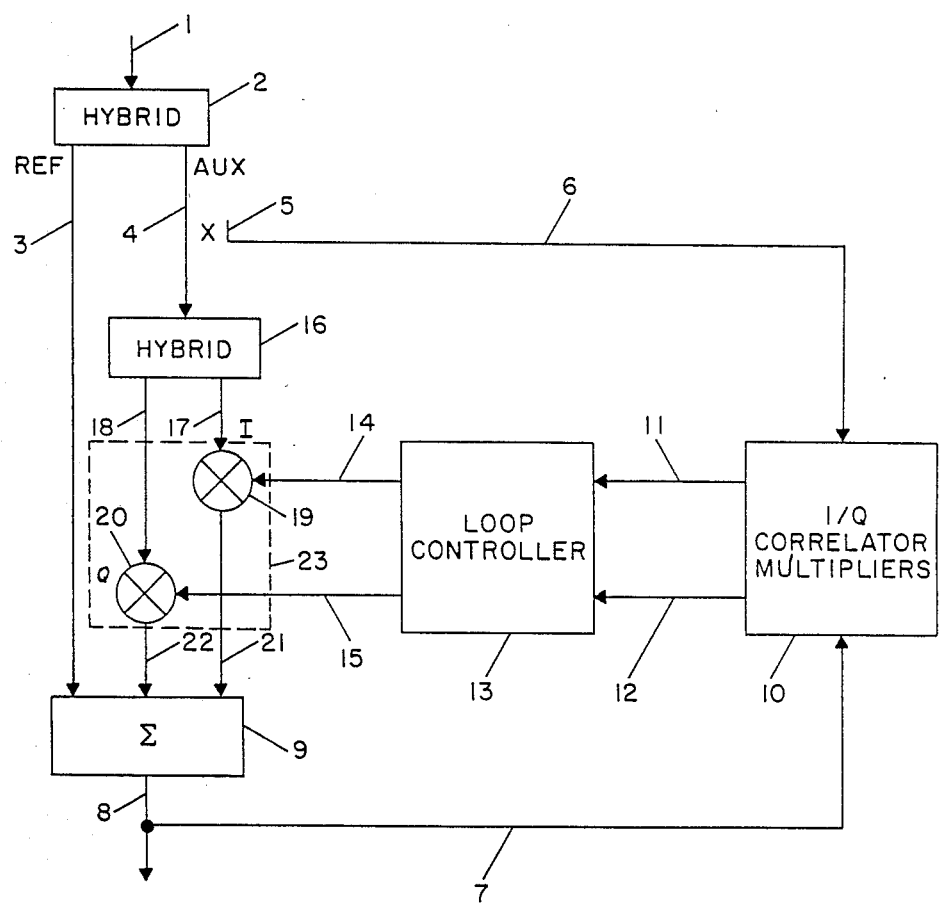
FIG. 1 is a functional block diagram of an LMS loop module according to the invention.

FIG. 1 illustrates a module according to the invention. An incomming or received signal 1 including desired and undesired signals is provided to hybrid 2 which generates a reference signal at reference port 3 and an auxiliary signal at auxiliary port 4. Reference port 3 emulates the protected antenna in an adaptive spacial processor while auxiliary port 4 emulates other suitably derived antenna signals. The purpose of the module is to reduce the power of the interfering signal by weighting the auxiliary signal.

Coupler 5 is connected to auxiliary port 4 and provides a reference branch signal via line 6 which is correlated with a feedback signal provided via line 7. The feedback signal is derived from the output 8 provided by summer 9. The correlation process is conveniently separated into the functions of multiplication and baseband integration as discussed below. I/Q correlator multipliers 10 generate I and Q baseband signals via lines 11 and 12 which are processed by loop controller 13 to generate in-phase drive signals via line 14 and quadrature drive signals via line 15 for driving the complex weighting of the auxiliary signal.

Such weighting of the auxiliary signal provided by the auxiliary port of hybrid 2 is accomplished in the following manner. The auxiliary signal is supplied to hybrid 16 which provides an in-phase signal at in-phase port 17 and a quadrature signal at quadrature port 18. The in-phase signal is weighted by mixer 19 driven by the in-phase drive signal provided via line 14. Similarly, the quadrature auxiliary signal is weighted by mixer 20 which is driven by quadrature drive signals provided by line 15. The weighted auxiliary signals provided by the outputs 21 and 22 of the mixers are summed by summer 9 with the referenced signal provided by reference port 3 to reduce the power of the interferring signals. The resulting signal provided by output 8, as compared to the incoming signal provided to input 1, has a higher desired signal-to-noise ratio.

The essential functions of the LMS control loop according to the invention include: (a) a complex (phase-amplitude) weighting provided by mixers 19 and 20; (b) correlation multiplication provided by I/Q correlation multiplier 10; (c) auxiliary reference branch processing via line 6 used to precondition one input to correlation multiplier 10; (d) a common feedback branch provided via line 7; and (e) a flexible baseband signal processor i.e. loop controller 13. Required capability, particularly with respect to bandwidth, is maximized by adapting a hybrid analog-digital approach in which functions (a) through (d) are implemented with analog circuits while function (e) is implemented with a hybrid device in the form of loop controller 13. As a result, the approach is applicable to any IF frequency depending on implementation tradeoffs for functions (a) through (d).

Figure 2:
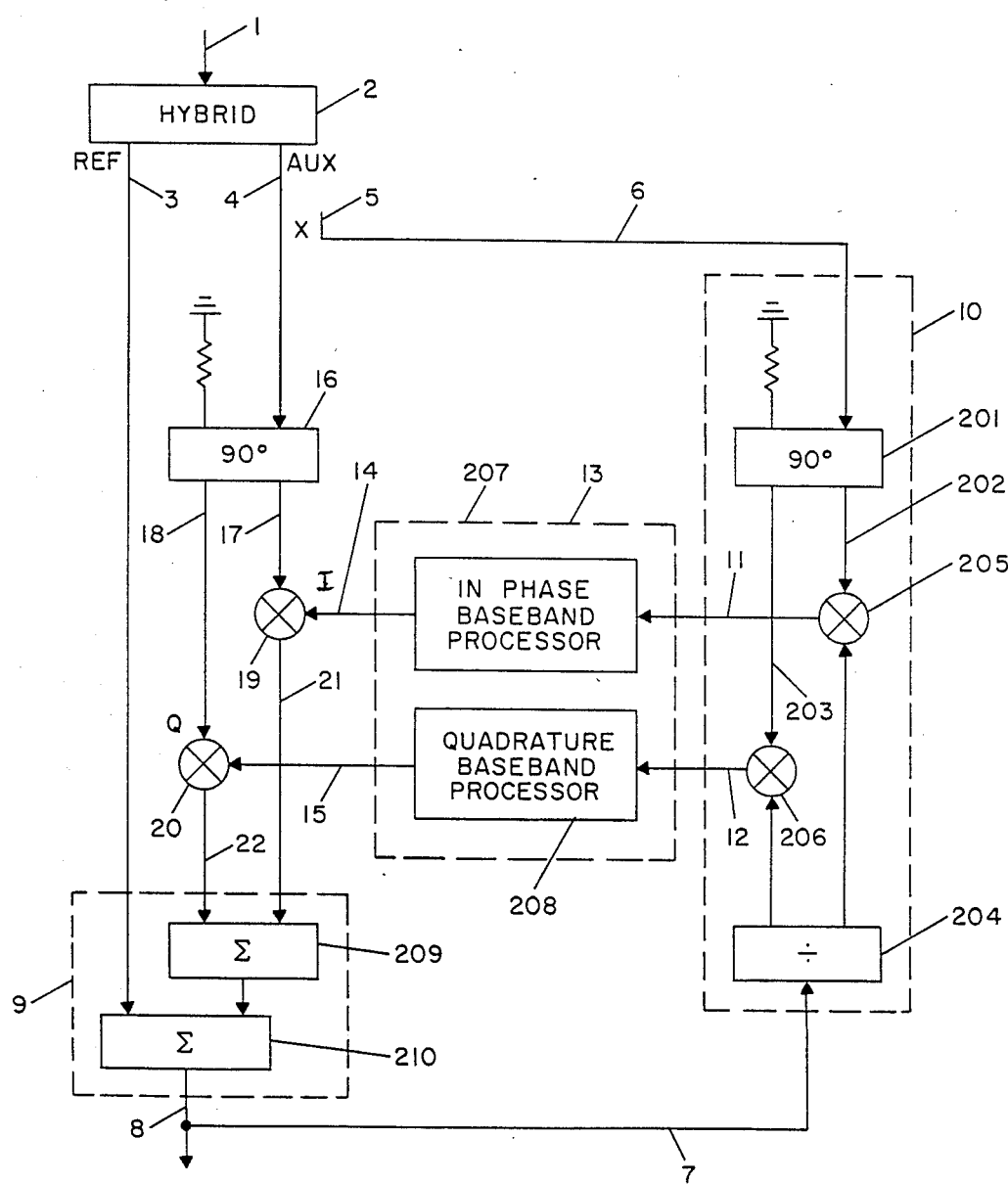
FIG. 2 is a functional block diagram of the module of FIG. 1 specifically illustrating the multiplier and controller functions.

As shown in FIG. 2, I/Q correlator multiplier 10 may be implemented by I/Q hybrid 201 providing an in-phase signal corresponding to the auxiliary signal via line 202 and a corresponding quadrature signal via line 203. These signals are mixed with the feedback signal provided by divider 204 by mixers 205 and 206 to complete the multiplication function and generate I and Q baseband signals via lines 11 and 12 which are provided to loop controller 13.

Controller 13 includes in-phase baseband processor 207 and quadrature baseband processor 208 which generate in-phase drive signals provided by line 14 and quadrature drive signals provided by line 15. These drive signals drive mixers 19 and 20 providing output signals via lines 21 and 22 which are summed by summer 209 and provided to summer 210 for addition with the reference signal provided by reference port 3.

Figure 3:
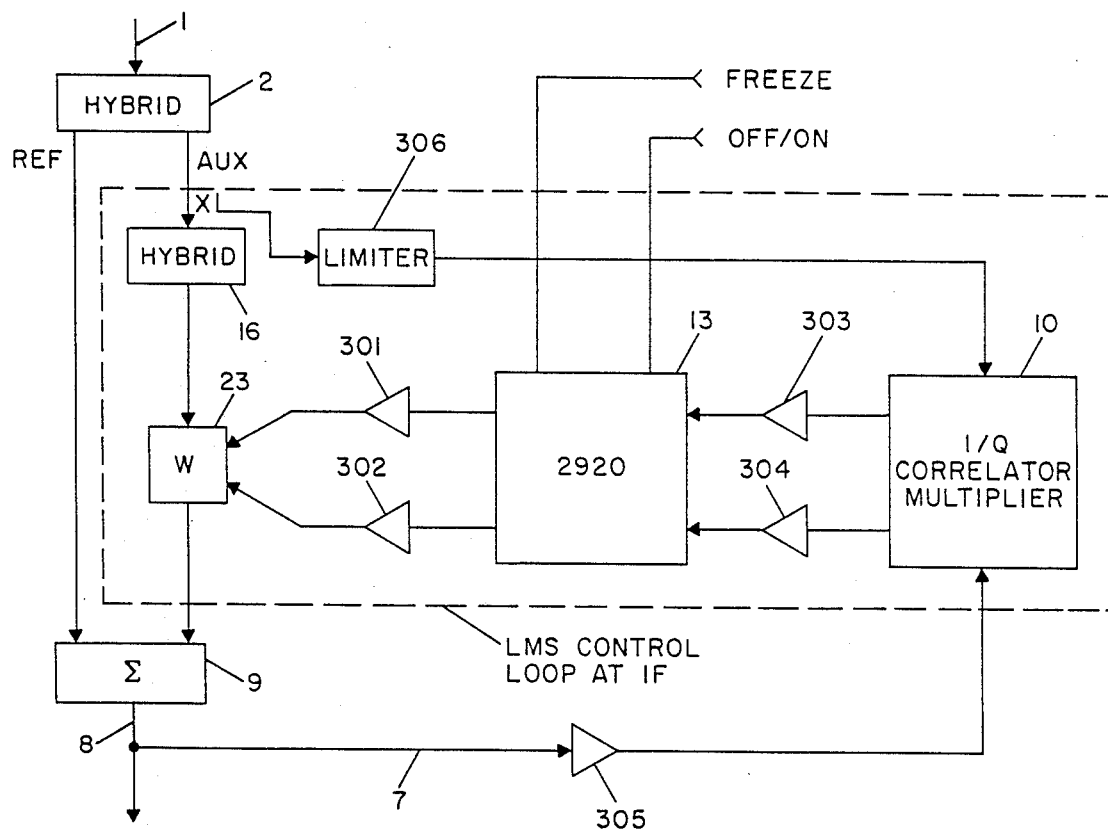
FIG. 3 is a detailed block diagram of a low cost LMS loop module according to the invention including a single-chip signal processing device.

As illustrated by FIG. 3, the Intel 2920 may be used as loop controller 13. The Intel 2920 is a signal processor chip combining analog functional elements with a digital processing capability in a single monolithic device. The device is fabricated with VLSI technology using an NMOS process. Preferably, the 2920 chip is programmed to provide a digital filter having a 1hz bandwidth for both I and Q channels with a baseband gain of 36dB. An additional gain of 23dB may be achieved by operational amplifiers 301 and 302. Furthermore, the chip may be programmed to provide a weight freeze function and an off/on function. Operational amplifiers 303 and 304 may be used to interface the I/Q correlator multiplier 10 with the loop module 13. Commonality is achieved by designing the module at a standard IF frequency of 70 Mhz. In order to accommodate wide bandwidths, the weighting network and correlator multiplier are analog and may be implemented with thick film technology. Use of the Intel 2920 is possible because loop controller 13 does not necessarily require a sampling speed equal to that of the Nyquist rate for broad band systems. Controller bandwidth requirements are principally dictated by platform jammer dynamics in many system applications. Convergence or transient response is inversely proportional to the baseband controller sampling rate. Since the loop controller provides integration and baseband gain in both the I and Q paths it can easily be implemented digitally using current LSI technology for systems which do not require an extremely fast convergence time.

A loop module according to the invention as illustrated in FIG. 3 was tested with both CW and broadband noise jamming signals. Results of this testing showed a significant cancelation on CW over a 20-Mhz bandwidth for a noise jammer. The results of such testing show that the requirements of many adaptive antenna systems can be met using current LSI technology at low cost and a package that is 1.7"×1.7"×0.2". The convergence time is adequate to track aircraft dynamics by many airborne systems. Limiter 306 preconditions the auxiliary input of I/Q correlator multiplier 10 and IF amplifier 305 is used in line 7 to control the amplitude of the feedback signal being supplied to multiplier 10.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A module for cancelling undesired signals received with a desired signal by a single antenna and having an output port for providing an output signal, said module for use in combination with other similar modules, said module comprising:
   (a) First means for providing the desired signal and any undesired signal received by the single antenna with the desired signal;
   (b) A first hybrid having an input port coupled to said first means and having a reference output port and an auxiliary output port;
   (c) A second hybrid having an input port coupled to the auxiliary output port and providing an in-phase output signal and a quadrature output signal;
   (d) An in-phase correlator multiplier having a first input port coupled to the auxiliary output port and a feedback input port coupled to the apparatus output port, said in-phase correlator multiplier providing an output signal;
   (e) A quadrature correlator multiplier having a first input port coupled to the auxiliary output port and a feedback input port coupled to the apparatus output port, said quadrature correlator multiplier providing an output signal;
   (f) Means for providing an in-phase drive signal and a quadrature drive signal corresponding to the output signals of the in-phase and quadrature correlator multipliers, respectively;
   (g) Means for weighting the in-phase and quadrature output signals provided by the second hybrid in response to the in-phase and quadrature drive signals, respectively; and
   (h) Means for summing the weighted in-phase and quadrature output signals and signals provided at the reference output port, said means for summing having the apparatus output port.

2. The apparatus of claim 1 wherein said means for providing in-phase and quadrature drive signals comprises an in-phase baseband processor and a quadrature baseband processor.

3. The apparatus of claim 2 wherein said baseband processors comprise a single monolithic NMOS device.

4. The apparatus of claim 3 wherein said in-phase and quadrature correlator multipliers comprise:
   (a) a third hybrid having an input port coupled to the auxiliary output port and providing in-phase and quadrature output signals;
   (b) means for mixing the apparatus output signal and the in-phase output signal of the third hybrid and for providing the in-phase correlator multiplier output signal; and
   (c) Means for mixing the apparatus output signal and the quadrature output signal of the third hybrid and for providing the quadrature correlator multiplier output signal.

* * * * *